United States Patent
Schtein et al.

(10) Patent No.: US 9,972,158 B2
(45) Date of Patent: May 15, 2018

(54) METHOD AND DEVICE OF AUTOMATICALLY DETERMINING A PLANOGRAM IN VENDING

(71) Applicant: Cantaloupe Systems, Inc., San Francisco, CA (US)

(72) Inventors: Igor Schtein, Walnut Creek, CA (US); Lee Tanenbaum, New York, CA (US); Justin Grant, Berkeley, CA (US); Mandeep Arora, San Francisco, CA (US)

(73) Assignee: Cantaloupe Systems, Inc., San Francisco, CA (US)

( * ) Notice: Subject to any disclaimer, the term of this patent is extended or adjusted under 35 U.S.C. 154(b) by 90 days.

(21) Appl. No.: 15/283,379

(22) Filed: Oct. 1, 2016

(65) Prior Publication Data
US 2018/0096555 A1 Apr. 5, 2018

(51) Int. Cl.
| | |
|---|---|
| *G06K 9/00* | (2006.01) |
| *G07F 11/00* | (2006.01) |
| *G06K 9/46* | (2006.01) |
| *G06Q 20/18* | (2012.01) |

(52) U.S. Cl.
CPC .......... *G07F 11/007* (2013.01); *G06K 9/4652* (2013.01); *G06K 9/4671* (2013.01); *G06Q 20/18* (2013.01)

(58) Field of Classification Search
CPC .. G07F 11/007; G06K 9/4652; G06K 9/4671; G06Q 20/18
See application file for complete search history.

(56) References Cited

U.S. PATENT DOCUMENTS

| | | | |
|---|---|---|---|
| 8,189,855 B2* | 5/2012 | Opalach | G06Q 10/087 382/100 |
| 2004/0218838 A1* | 11/2004 | Tojo | G06F 17/3025 382/305 |
| 2009/0059270 A1* | 3/2009 | Opalach | G06K 9/00 358/1.15 |
| 2011/0276364 A1* | 11/2011 | Bergstrom | G06Q 10/04 705/7.29 |
| 2015/0070470 A1* | 3/2015 | McMurrough | G06F 3/013 348/46 |
| 2016/0012594 A1* | 1/2016 | Romanik | G06T 7/73 382/203 |
| 2016/0292183 A1* | 10/2016 | Cho | G06F 17/30247 |

(Continued)

*Primary Examiner* — Sean Motsinger
(74) *Attorney, Agent, or Firm* — Kim Rubin, Patent Agent

(57) ABSTRACT

A method is described for the automatic determination of a planogram in a vending machine using image processing. Novel steps include the use of a Gaussian map in a two-dimensional color space, such as the HS plane, to create high-dimensionally color vectors for all and for selected portions of images. Multiple feature detection/extraction algorithms are run between multiple idealized reference images for a product and one image from one vending machine coil location. The large resulting candidate feature list is pruned in a series of steps using both color and gray-scale color vectors and small area image matching around features. Remaining candidate features are ranked by a RANSAC outlier removal step, with the top ranked product then being the correct product in that coil in the planogram. Steps are repeated for all coils in a vending machine.

9 Claims, 12 Drawing Sheets
(6 of 12 Drawing Sheet(s) Filed in Color)

(56) References Cited

U.S. PATENT DOCUMENTS

2017/0237899 A1* 8/2017 Wexler ............... H04N 5/23222
                                                    348/207.11
2017/0278246 A1* 9/2017 Kim ..................... G06T 7/0042
2017/0299435 A1* 10/2017 Rhoads ................. G01J 3/2823

* cited by examiner

VENDING MACHINE
WITH FILLED
PLANOGRAM

Fig. 3

SAMPLE PLANOGRAM
REPRESENTATION

METHOD AND DEVICE OF AUTOMATICALLY DETERMINING A PLANOGRAM IN VENDING

BACKGROUND OF THE INVENTION

This invention relates to the servicing of vending machines. More specifically, it relates to determining the inventory of products in a vending machine.

Vending machines have long been used to provide consumers with convenient access to consumer-packaged goods (CPG). Vending machines are typically owned or leased and serviced by a vending company, who typically manages and services a large number of machines in a geographic area. Determining what product are in a vending machine and changing the product mix is an important—and time consuming—part of managing and servicing vending machines. The arrangement of particular products in particular slots, or "coils" in a vending machine is called a planogram. A "driver" is typically responsible for stock replenishment and other service tasks. For these other service tasks the driver operates as a "field technician," or another title. For convenience, we refer to all such in-field service performers as "drivers."

Planograms for each machine are recorded, but are often in error for various reasons, such as a driver mis-recording a planogram or a driver re-ordering a planogram and not recording the change, or a driver loading different or incorrect products into a machine.

Although some vending machines are equipped with hardware and communications to record and transmit sales, such sales are based on coil number (slot location) and do not know what product is in what coil. That is, they are unaware of the actual planogram in the machine.

A weakness of the prior art—manual planogram recording and auditing—is slow, expensive and error-prone.

SUMMARY OF THE INVENTION

This invention relates to using machine vision technologies to automatically determine planograms. Using prior art machine vision techniques is not effective for this problem because CPG are small bags that are often distorted, tilted, partially obscured, and very busy graphically with text and graphics.

The method of an embodiment of this invention uses a series of steps, novel in their sequence and use in this application.

The basic outline of determining inventory is as follows. First, have a database of reference CPG images. This database may comprise thousands of ideal images of the front of a CPG bag or box. A digital image is taken of the front of the vending machine. This image is segregated into individual images of each slot. Then each slot image, the "vending image," is compared against each image in the reference database to determine the most likely matching product.

The most challenging part of this outline is the "comparing." Prior art image comparison techniques fail in this application, for reasons described above. In addition, prior art image comparison techniques execute very slowly, and thus are computationally expensive.

Embodiments of this invention use generally the following steps:

(a) acquire CPG reference image database, the product ID database;

(b) create "reference image color vectors" for each CPG in the product ID database;

(c) create a gray-scale image and HS image for each CPG in the product ID database;

(d) run at least one feature detection/extraction algorithm on the gray-scale image of each image in the product ID database;

(e) acquire a color vending image of a slot in a vending machine, the color vending image;

(f) map color vending image into a Gaussian map in a color space to create a "vending image color vector" for the vending image;

(g) discard pixels with outlying color values;

(h) compare the resulting color vector to a subset of the database color vectors;

(i) create a sorted list of best matches—the "candidate product ID list;"

(j) create a gray-scale image of the color vending image; create an HS image of the color vending image;

(k) run a plurality of rotationally invariant feature matching algorithms between the gray-scale vending image and each gray-scale candidate product image in the list, using the feature/extraction results from each image; match only features of similar type;

(l) for one vending image, record both the transform and confidence factor for each feature identified in the last two steps; these are the "candidate feature list;"

(m) cull the candidate feature list by the transform type, such as size and location of feature;

(n) sort the culled candidate feature list by confidence and transform;

(o) first prune the culled candidate feature list by comparing color feature match threshold;

(p) second prune the culled candidate feature list by running feature detection/extraction algorithms on gray-scale images from the database and the gray-scale vending image; prune out candidates based on a gray feature match threshold value;

(q) third prune using small matching image areas color vector comparison around features;

(r) fourth prune using large matching image areas color vector comparison around features;

(s) for each remaining feature in the fourth pruned candidate feature list execute a Ransom Sample Consensus (RANSAC) algorithm, saving both transforms and confidence levels;

(t) discard outlying features from the feature list;

(u) repeat steps (i) through (t) for all candidate features in the candidate feature list;

(v) determine the best match, for each candidate product ID in the candidate product ID list, with the vendor image, using the total number of feature matches and highest total confidence values, or both;

(w) the best match is the identity of product in that vending slot;

(x) repeat above steps (d) through (w) for all slots in the vending machine;

(y) the result of the above step is the planogram for a vending machine.

Compared to prior art in image processing and prior art in image recognition, CPGs have unique characteristics, both positive and negative, with respect to fast, accurate image matching. First, CPG images tend to be mostly bright colors, with small areas of white and black. Second, CPG products in vending machines are often tipped or rotated, and often somewhat crumpled. Lack of identifiable horizontal or vertical lines makes "straightening" images prior to processing unreliable, unlike common prior art. Third, the edges of product images, both for reference images and for vending mages tend to be poorly defined and are rarely rectangular. Unlike prior art, this requires novel "trimming" techniques to avoid processing image pixels that are not related to the package. Fourth, the lighting in the vending image is often poor, generating (i) specular reflections, (ii) imagery around the sides of the package; and (iii) a portion of a coil in front of the product. However, on the plus side, only whole images are matched. That is, an entire package image is either one product or another product. It is not necessary to identify separate portions of an image of a coil in vending machine. Also on the plus side the bright colors may be used as part of image recognition. Another plus feature is that feature size mapping must be all about the same. That is, if the size ratio between the reference image and the vending image is 3:1, then all valid matching features need a size different close to this. Prior art often must contend with varying feature size difference. Similarly, all valid matching features will have similar rotations. A package might be turned 90°, or upside down, or tilted by 15°. However, all features will have a similar rotation, except that crumpled areas of a package often appear to have a somewhat different rotation. These positive and negative differences between classifying CPG images from a vending machine against a database of high quality images require the novelty of embodiments of this invention.

Color information is used novelly in two places in embodiments. First, the overall color mix of a product may be used as a fast, course way to dramatically reduce the number of reference images to consider. That is, a vending package that is mostly orange with a bit of green does not need to be compared to a reference image that that is mostly blue with a bit of yellow. For this purpose, novel color vectors are used. Key features on packages are normally high-contrast areas. Considering gray-scale images only may efficiently identify these. One such candidate features are identified, then color information may be used again to cull features that are not the right colors. Again, novel color vectors are use, but now on small areas around features rather than for the entire, aggregate product image. The creation of initial color vectors for entire images first discards outlying pixel values that are close to black or close to white, so as to remove background pixels that are not part of a CPG product and to remove specular reflections from vending images and white background from reference images. However, color vectors computed for small areas inside an image use all pixels, including white and black.

One particular novelty is the use of "Gaussians" in a special color space, such as the hue-saturation plane (HS) of an HSV color space. In particular the use of a two-dimensional Gaussian map is novel. Variations in lighting between a vendor image and a reference image will often result in large value (light v. dark) variations. However, such lighting has a smaller impact on hue and saturation. Nonetheless, there are always some color shifts between the vending image and the reference image. In order to match color it is necessary to accommodate such color shifts, particularly saturation. Prior art "binning" of colors or the use of 2D or 2D correlation to match color images or color features fails to reliably recognize CPG images due to the special conditions discussed above. Embodiments use Gaussians place in a color plane (a two-dimensional Gaussian map) so that classification of a single pixel in this color plane results in non-zero values for all places in the plane. The Gaussians in the map overlap, unlike square bins. Color shifts in an image will then tend to smoothly and consistently shift peaks in the resulting color vectors all in the same direction, minimizing a later calculated Euclidean distance between color vectors from the reference image and color vectors from the vending image. The number of Gaussians used, or their sigma (diameter) dependents on the level of saturation and hue shifting in the vending images. Generally HSV is preferred to RGB or CYMK because it is closer to "perceptual" linearity and so Euclidean distance more closely match perceptual differences. Since most CPG manufacturers purposely make their product appearance as different as possible from other CPG products, HSV is more likely to take advantage of this perceptual separate of product. However, there are only color spaces that are even more "perceptual" than HSV. Ideally such a color space to be used in embodiments would also be minimally sensitive to the shifts that occur with real-world lighting of vending images.

Yet another novelty is the use of multiple feature/extraction algorithms. Such algorithms, including SURF, BRIK, MSER, and SIFT, were developed for specific applications. None of these work adequately alone for CPG image evaluation. Each such algorithm finds significantly different matching feature sets. A novelty is using multiple algorithms to create a larger, more comprehensive potential matching feature set. However, this potential matching feature set is so large, often with a 1000 features, that now novel techniques must be employed to "prune" this candidate feature list to a smaller, higher quality number of features before further processing for "best match" between different candidate products. Multiple pruning steps are used including the use of both gray-scale and color comparisons images. Some pruning steps again use the novel color vectors. Pruning steps take advantage of unique characteristics of CPG images, as discussed in summary above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 shows a color schematic view of products in a planogram.

DETAILED DESCRIPTION

A vending company may manage thousands of vending machines. A vending machine may have roughly 20 to 200 CPG products. A CPG database may have thousands or even millions of images. The number of features detected or extracted by a feature detection/extraction algorithm may be in the hundreds of thousands. Running a single feature detection/extraction algorithm on a pair of images may be millions or billions of computer instructions. Thus, without some method steps to limit, cull or prune intermediate lists size or times a step must be executed the computational requirements are excessive, even for modern computers. Consider the product of: the number of vending machines times number of coils in a vending machine times size of the CPG database times multiple feature detection/extraction algorithms times number of features detected by each.

Note that "feature detection" is largely but not exclusively creating "keypoints" in a single, single-valued-pixel image. Such keypoints typically, but always contain a location in the image and a radius, or a similar "size" metric. Different feature detection/extraction algorithms detect different types of features; although multiple feature detection/extraction algorithms detect compatible feature types. One usage of a keypoint is any location or feature located by a feature detection/extraction algorithm in either a source image, such as an image in the reference database, or in a target image, such as a vending image. Usage of keypoint may refer to both the source and target location. The algorithmic representation of a keypoint varies by the algorithm and convenience. For example, a keypoint may be partially described by a single pixel that is at the "center" of a feature location. Here, "center" may be determined as a geometric center, a centroid, or other appropriate algorithm-appropriate location.

Figure 1:
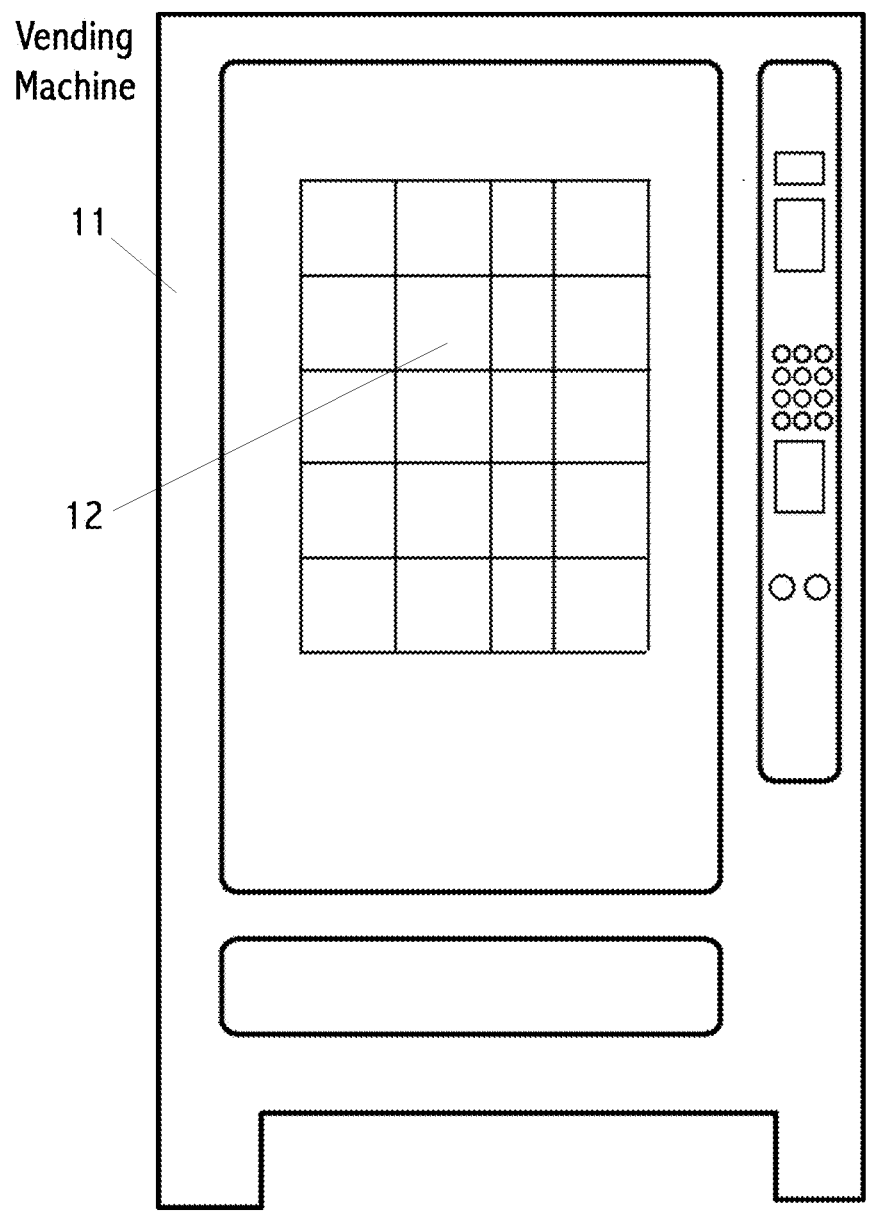
FIG. 1 shows a schematic view of a vending machine.

FIG. 1 shows a generic schematic of a vending machine 11 and its empty planogram 12. This planogram consists of four columns with five rows for a total of 20 slots, or coils. Each slot typically dispenses one kind of product. Products may be consumer packaged good (CPG) such as chips, or drinks, or non-food products such as batteries or socks.

Figure 2:
FIG. 2 shows a color view of vending machine with a planogram full of CPGs.

FIG. 2 shows in color an exemplary vending machine with a full planogram with 58 coils. Note that in some places two different coils hold the same product, such as chips. Note that the products typically have bright colored graphics on bright colored backgrounds.

Figure 3:
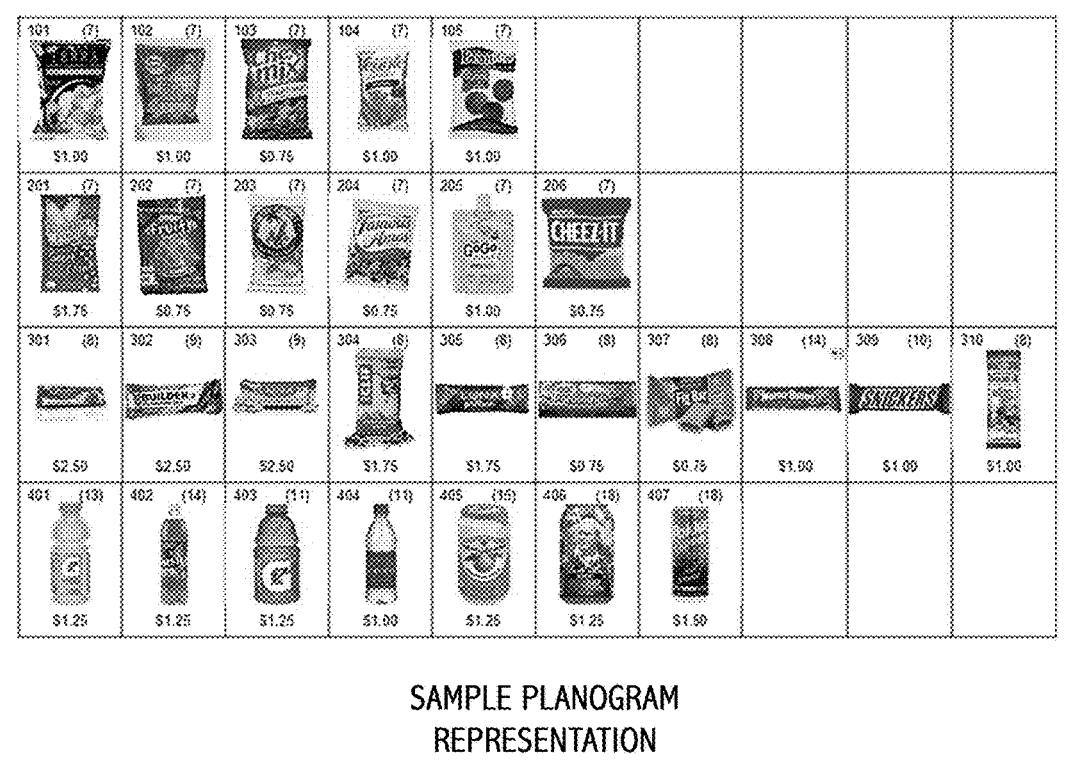

FIG. 3 shows in color an exemplary representation of products in a planogram. Here, an image of each product is arranged in a location in a grid. Such product images may be idealized image from a database. Note that product shapes are not rectangular, have no background, and may in different orientations.

We first need to define a "color vector." For this we start with a color space, such as RGB, CYMK, HDV or HSV. HDV is sometimes called, YCbCr 709. YCbCr 709 (or variations) has some computational advantages because this color space is used by MPEG-2 and MPEG-4, and is supported in fast graphics chip hardware.

There are many different color spaces. Embodiments of this invention may use any color space, however, there may be practical advantages to one over another. Also, conversion is easily done from one space to another, and so a different color space may be used in different steps. A color space may have three dimensions (sometimes called, "planes") as is most common, or two, or more than three. It is often convenient to consider only two of three dimensions in a color space. In such a case, it is convenient to consider those two dimensions as their own color space. For example, hue and saturation may be used, ignoring brightness, as brightness is highly dependent on lighting and shadows, whereas hue and saturation of an image of a CPG is less sensitive to lighting variations. Consider an HS plane (hue and saturation). An alternative to the HS plane from HSV color space is the HD plane from the HDV color space. Each axis may be divided into 10 segments, generating 100 cells within this color plane. Now, place one pixel on the plane. The hue and saturation values of the pixel will place the pixel into a single cell. We may think of this as a 100-element vector. For hard-edged cells, for one pixel, the values in the vector will be all zero except for one value of one, where the cell where the pixel lies. However, the cells in the color plane my not have hard edges. They may be convolved, or "blurred," or have a Gaussian shape. In this case, a single pixel may land in more than one cell, with various values based on the shape and overlap of the cell shapes. The sum of the values of the cells, for one pixel, will still be one, considering normalization.

The distribution of Gaussians in the plane may be important for a quality implementation. Gaussians may be distributed in a hexagonal pattern, rather than a square or rectangular pattern, to minimize the impact of pixel falling in between two Gaussian peaks. Also, Gaussians may be placed at or close the edges and corners of the plane so that pixels falling on the edges or corners of the plane are not effectively lost. Ideally, the Gaussians overlap so as to minimize the effect of randomly chosen pixel values (or chosen so as to represent a typical statistical distribution of colors in images) have approximately constant weight in vector length.

Applying this technique to all the pixels in an image, we obtain a vector for every pixel. These vectors may be summed to produce an "aggregate color vector," or simply "color vector" for the image. This is a representation of all the colors in the image. Such a 100-element color vector may be considered a "high-dimensionality vector." The difference between any two vectors is a scalar that is the Euclidian distance in this 100-dimensional space of the two vectors. Such a difference is the aggregate color similarity of two images. The advantage of "blurring," or convolution, or Gaussian cells is that minor color shifts in the images generates a small error in the vector. For example, if one image is slightly more orange than another, its vector will be shifted slightly along the hue axis.

Discarding outlier pixel values is used for creating color vectors of entire images. Black and near black pixels are discarded because they may be background pixels that are not part of a CPG product, or may pixels from a coil in front of the package, in a vending mage. White and near white pixels are discarded because they may be part of a specular reflection. Since the color vector generation of reference images in the database and vending images must use the same algorithm, such discarding of outlier pixel values should be applied uniformly to both images. Note that such outlier pixels may be none. Scope of claims includes discarding no pixels. Such scope exists in part to avoid workarounds to avoid infringement that are in fact equivalent and are infringing.

Computing color vectors for areas within image, as distinct from color vectors for the whole image, do include black and white pixels. That is, normally, pixels are not discarded prior to computing these color vectors. However, as for previous scope of "discarding pixels," minor or trivial discarding is within the scope of the claim. The construction of the word, "all" includes "substantially all," wherein "substantially" means that it accomplishes the same outcome, as measured by usefulness for its intended application, as fully all.

A "Gaussian," in the context of the previous color vector generation, is the idea that each cell in the color space plane (or other than two dimensions) has a Gaussian weighting. Each Gaussian actually spreads, with some value, across the entire color space—although far from the center of the Gaussian the value is quite small. Thus, for even a single pixel, each element of our color vector will have some non-zero value. The size measured as sigma for each Gaussian, and the number of Gaussians along each axis of the color space may be optimized. In general a range of 4 to 24 Gaussians per axis is reasonable. For convenience, we will often talk about an exemplary 10×10 array of Gaussians, although this is arbitrary. In practice, it is often better to use more Gaussians in the hue axis and fewer in the saturation axis because variations in lighting cause saturation shifts more than hue shifts.

So far, we have not discussed either the extremes of black and white, and "outliers." Images of CPG are not rectangular for either ideal reference images or the actual images captured in the field of real vending machine planograms. However, when processing images using a computer, they are usually treated as rectangular, although a z-axis may be used to discard or ignore pixel locations with no value. Non-existing pixel location is a reference image may appear white. Areas off to the side of a physical product image may be black or dark. Typically, we do not want these white or dark areas to impact our steps. The total fraction of pixels that are white or dark in a rectangular image is often high and this fraction would swamp out useful color information in a color vector. Therefore, various processing steps ignore, prune out, discard or otherwise ignore such "outlier" values. A specular reflection from a shiny package is likely to white or very light. A portion of a coil obscuring a vending image is likely to be black or dark. Thus there are multiple reasons to ignore pixels and vector elements that are close to white or black. Most CPG packages do not contain large areas of black or white, and so loss of this information in image comparisons is not a major loss. This is a major departure from prior art image recognition. The thresholds for such outlier discards are flexible and may be optimized. They may also vary depending on the product and aspects of the vending image. Thresholds in the range of 1% to 30% of total value range may be used. Another threshold range is 3% to 15%. Such discarding is optional and may not be in all embodiments.

We have not yet discussed resolution of images, that is, number of pixels. Embodiments are nominally independent of resolution. However, in practice, it is strongly desirable to use the lowest possible resolution that achieves the desired result. More pixels rapidly increase processing time. Therefore, often, different steps in embodiments will use different resolutions. An image may be decimated, averaged, or otherwise reduced in computational size. Typically analyzing features ideally uses a higher resolution than aggregate information.

Although resolution and resolution changes, such as decimation, are not discussed explicitly in steps, such processing is common, as those trained in the art know. It may be convenient to generate and store images at multiple resolutions.

Figure 4:
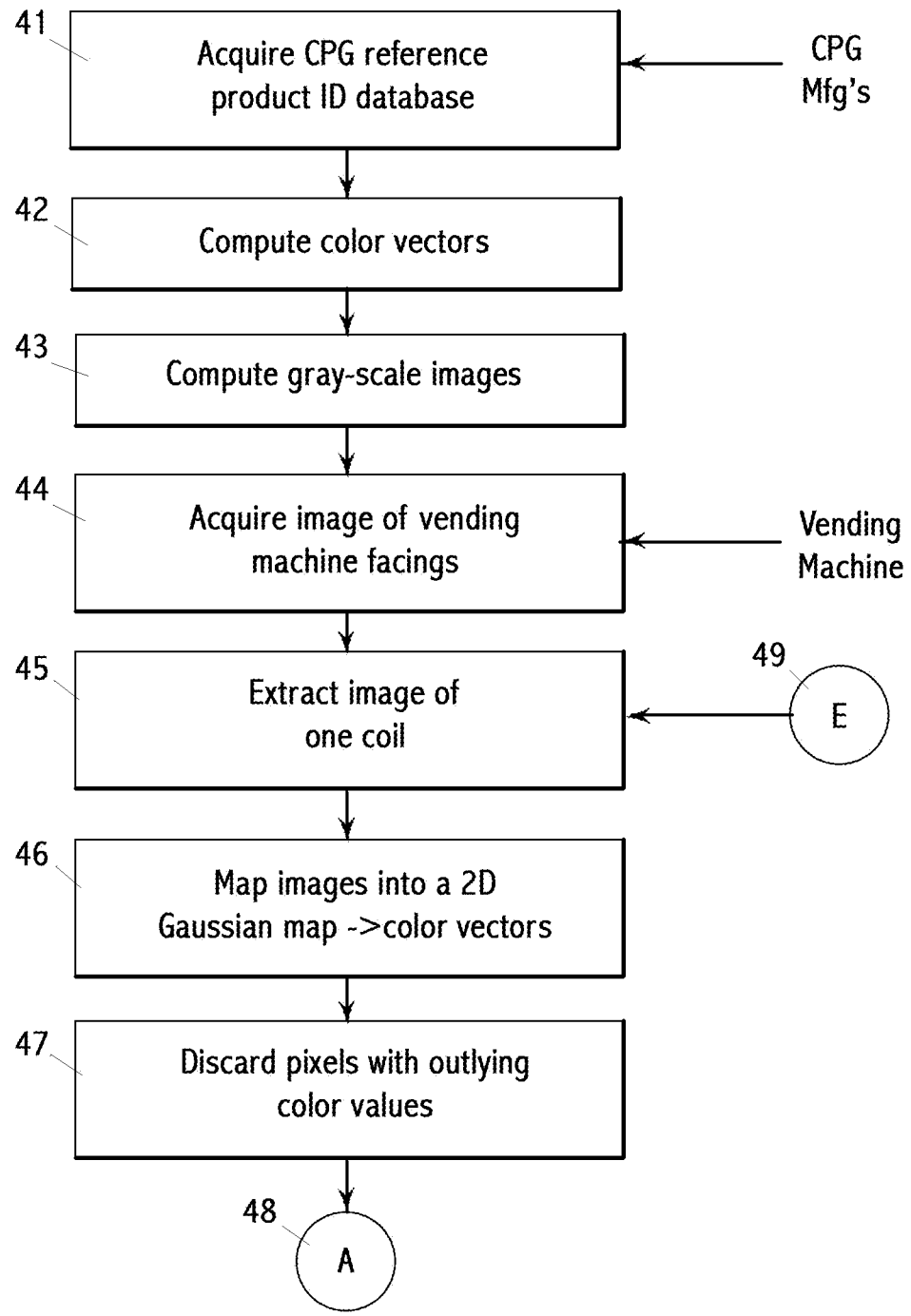
FIG. 4 shows the start of one embodiment of a method of this invention.

FIG. 4 shows the start of one embodiment of methods of this invention. The steps are continued on FIGS. 5-7. All descriptions below are exemplary. As those trained in the art know, there are often different names for the same thing or an equivalent thing. Equivalent data structures and equivalent method steps are explicitly claimed as embodiments. An equivalent step, herein, means taking the same input, performing a different or similar action on that input, and generating the same or functionally equivalent output. Functional equivalent, herein, means suitable as input for the next step to ultimately obtain the same result of the invention. Starting with 41, a reference database of consumer packaged goods (CPG) database is obtained. The CPG manufacturer often provides images for such a database and collections of such images are available from industry sources. This reference database includes at least one image, usually in color, of each product and identification of that product. Each such image is called a "reference image."

In step 42 color vectors are computed for each image in the reference database. This step may be done at any time prior to using a color vector. The step may be performed all at once or distributed over time. For example, color vectors may be computed as needed. See above for information about color vectors. In step 43 a gray-scale image is computed for each image in the reference database. This step may be done at any time prior to using a color vector. The step may be performed all at once or distributed over time. For example, gray-scale images may be computed as needed. See FIG. 8, designator 26, for an example of a gray-scale image of reference image FIG. 8, designator 24. Also, in this step we may compute an HS single valued pixel image, as described below. There are multiple ways to create a "gray-scale" image from a color image, as those trained in the art know. A linear combination of the pixel values of the color planes may be used. Non-linear combinations may be used, such as adding or correcting for gamma. A Euclidian distance of color vectors may be used. The essence of a gray-scale image is that it describes the values, or brightness of pixels, by some metric or purpose. An HS reference image is a reference image in color that is reduced to a two-dimensional image in an HS color plane. An HS vending image is a vending image in color that is reduced to a two-dimensional image in an HS color plane.

Preprocessing steps for the reference images may include other preprocessing, such as creating color vectors for restricted colors, such as only for R G or B data from an RGB image. Also first running a "blob detector" may speed up feature detection/extraction on an image. Blobs are interesting areas of the image. Typically these areas contain strong gradients—often a gradient in more than one direction, such as a corner.

In step 44 an image is acquired of a vending machine facings. Such an image may be a still image or a video image. It is typically color. Information regarding infrared or ultraviolet may be in the image. The original image may include virtual reality information. The image may be taken by hand, for example by a driver at a machine, or may be automatic, such as by a fixed camera. If the image is not digital originally, it is converted to digital. In step 45 an image of one slot, or coil, is extracted from the image in step 44. Step 44 may be optional, as an original image of just a single coil may be used. In either case, step 45 (and later steps) is ultimately repeated for each coil in the vending machine. Each such image is called the "vending image."

Computing multiple planograms for multiple vending machines requires executing method steps of this exemplary embodiment repeating from step 44 for each new vending machine.

Computing a complete planogram for one vending machine requires executing methods steps of this exemplary embodiment repeating from step 45 for each coil in the vending machine. This looping is shown by re-entry point bubble E, 49. The "vending image" processed in subsequent steps, described below, is one image of one coil location in one vending machine.

In step 46 we create color vectors for both the reference images and the vending image. Color vectors may be computed in advance for reference images in the CPG database. For example, they could be computed between steps 41 and 44. A preferred embodiment of creating the color vectors is the use of novel Gaussians in an HV color space plane. However, other models for creating color vectors may be used, including the use of other color planes or a three-dimensional color space. In addition, convolution may be used in place of Gaussians to "blur" color information. Such "blurring," by any technique causes similar, but not perfectly matching colors between the reference image and the vending image to be closer, as measured by the ultimate Euclidian distances of the vectors. Optimizing the Gaussians is discussed elsewhere. However, a fixed Gaussian distribution may be used. Other embodiments may use Gaussians in single color axis and also may use Gaussians in three axes in a color space. Color spaces other than HSV may be used, such as RGB, CYMK, CIE, or a "perceptual" color space. Different color spaces may be used for computing color vectors for different steps.

A preferred embodiment is computing a color vector using full color images. Then these vectors used to discard product IDs from the candidate product ID list whose vectors are "too distant,"(e.g., Euclidian distance) from the vending image. However, other interesting embodiments also compute and use color vectors of "single colors" of both the reference image and the vending image to discard too distant product IDs. Such "single colors" may be just the R, G, or B data from an RGB representation of images. In addition, "single colors" may be more narrowly defined. For example, a portion of the color vectors may be used, to select a narrower color or range of colors, such as only yellow. An example of a "yellow only" image pair is shown in 25 and 22 in FIG. 8. Such multiple filtering steps considering the aggregate images (rather than just feature areas) can speed up later processing considerably by shortening the list of candidate product IDs. R, G, B pruning may be done in any order during culling/pruning. However, the order described is a preferred embodiment.

Yet another embodiment is to create an image that uses a single scalar per pixel, only that pixel value is the geometric mean of the pixel's hue and saturation. We refer to the values in this image as H*S.

In step 47 we discard vectors from pixels with "outlying color values." "Outliers" is discussed above. This step may be performed in parallel with step 46 or prior to step 46. Typically, outlier pixels are white or light and black or dark. The threshold for outliers may be different for the reference image and for the vending image. Typically, since the reference image is higher quality and vending image is lower quality the thresholds (closeness to black or white) may be less for the reference image. Discarding vectors from pixels with outlying color values is optional.

A color vector is essentially the color information about the entire image, without respect to where the color is in the image. It tells, in essence, "how much orange," or "how much green" is on the front of the CPG package. We may refer to these color vectors as "aggregate color vectors" because they hold information for the entire image, rather than just selected feature areas. The resolution of the color is roughly the number of Gaussians—keeping mind that the Gaussians overlap. Since a preferred (but not the only) embodiment uses a color space of the HS plane, the color information includes color saturation (S) and hue (H) but not brightness (light v. dark colors). Because different lighting conditions affect the apparent saturation more than hue, it is typically appropriate to have higher resolution, that is, more Gaussians on the hue than on the saturation axis of the color plane.

Figure 5:
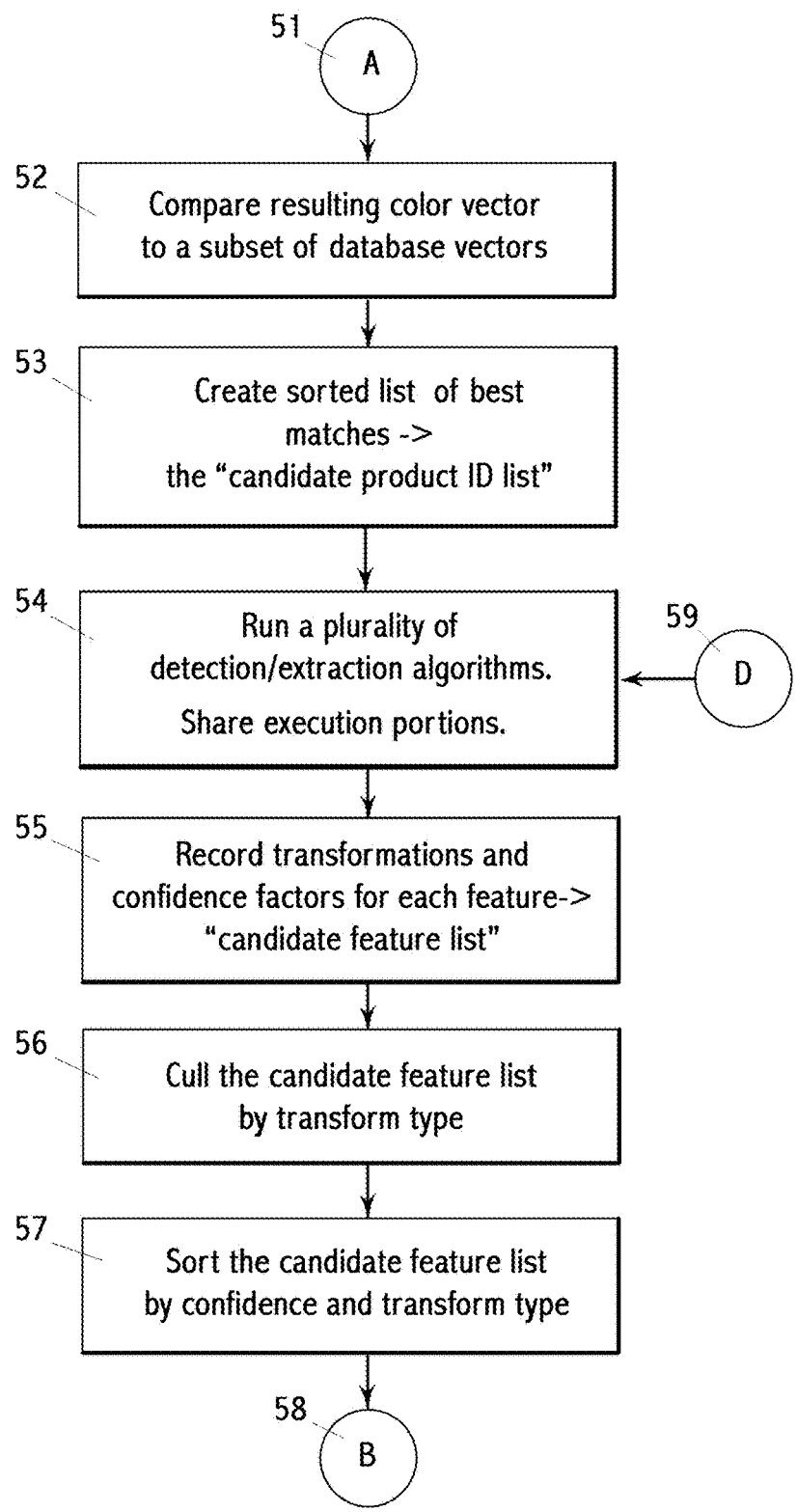
FIG. 5 shows a continuation of FIG. 4.

Steps of this exemplary embodiment are continued via bubble, "A," 48 onto FIG. 5.

In FIG. 5, step 51, bubble "A," is a continuation from FIG. 4.

In step 52, we compare the color vector created in steps 46 and 47 from the vending image against a subset of the color vectors of the database reference images. The size of the subset may be one image all the way up to the entire database. However, typically there is some a priori reason to only consider a subset of images. For example, it may be known that only a certain group of products will ever be placed in that vending machine. For example, if a machine dispenses only bag CPGs, and cannot dispense cans, there is no reason to compare to CPG images of cans. Because the entire database may be very large, it is important practically, but optionally, to limit the number of reference images used in an embodiment: thus the modifier, "subset."

Step 52 also uses a "cheap filter" to reduce the size of the "candidate product ID list," or "candidate product ID list." For efficiency reasons, we prefer to run fact, cheap filters, first, and slow, expensive filters last, since by then there are less images to compare or fewer features to consider. For this step in particular, there are numerous other "cheap filters" that could be run. Comparisons might be done on product shape, or on low-resolution versions of images, using a simplified color vector. Embodiments are specifically claimed where step 52 is running a different or unspecified, "fast filter."

There are multiple ways to compare vectors for "closeness," particularly for high-dimensionality vectors. One method, but not the only method in embodiments, looks at the Euclidian distance between the two vectors being compared. Note that it may be appropriate to covert to a different color space before the comparisons. It also may be appropriate to "warp" the color space prior to an unweighted Euclidian comparison. The purpose of any such transformations is to that vending images are as close as possible to the correct reference image and also as far away as possible from incorrect reference images. Various transformations may be tested in this way to choose an optimal transformation. However, all such transformations are optional. An alternative method that accomplishes the same thing (and is thus an embodiment) is to space the Gaussians non-uniformly or to assign them non-uniform amplitudes. A higher-amplitude Gaussian would place more emphasis on the particular color where it resides. Some colors that occupy a relatively narrow part of a color space, such as yellow, are nonetheless particularly useful in identifying a particular CPG. So, in this example, it may be appropriate to use a higher-amplitude Gaussian in the yellow area, or to space the Gaussians closer near yellow—in essence, "magnifying" the color area around yellow.

Yet another way to do comparing is to compare the cosines of the angles of the vectors. Yet another way to do comparing is to the distances between the vectors in each dimension. Vectors may or may not be normalized prior to comparing. Normalization of vectors may be inherent in the way the vectors are generated. Normalized or unnormalized vectors will match different features. There are embodiments and applications that benefit from using either normalized or unnormalized vectors. Comparing two vectors normally generates a scalar value. The closer the vectors, the smaller the scalar value, and thus better the match.

Once we have compared the aggregate color vector of your one vending image against a set of aggregate color vectors of reference images, each such comparison yielding a scalar (although vector outputs of a comparison may be used), the comparisons may be placed a sorted list, step 53. Some fraction of this list, such as the top 10%, or the top 50, becomes the "candidate product IDs." Suitable ranges are 0.1% to 75%, or 5 to 500 candidates.

Up through step 53 we have considered only the "aggregate" colors of images. We have used this information to reduce the number of possible reference images to consider further. We have not yet considered individual features in images. For this, we use gray-scale images, of both the reference images and the vending image. Typically feature matching algorithms use an image where the pixels have a single scalar value: that is, a gray-scale image or an image in only one color plane, such as red, green or blue for an RGB color space. Other color spaces will generate other color planes.

Both traditional gray-scale images in the individual red, green and blue (R, G, B) colors of the RGB color space are "scalar-valued-pixel images." They all contain value information; that is, the lighter the pixel the brighter that spot in the original scene. In the HSV (hue, saturation, value) color space, value is broken out as separately as V. Most image processing algorithms, in particular, feature detection and extraction algorithms such as SURF, BRIK, MSER, and SIFT (and many others) work only on scalar valued pixel images. In the particular application of this invention, value is the least consistent between reference images and vending images due to inconsistent lighting, folds in packages, shadows, objects in the way of the images, and specular reflections. Hue and saturation are more consistent between reference images and vending images. Therefore, a useful single valued pixel image is comprised of hue and saturation information. In one embodiment, use such an image constructed from the geometric mean of hue and saturation. That is: the square root of H*S, for each pixel. We call this the HS image.

Ideally, we compare the vending image to the multiple reference images first, or early in the culling of the candidate feature list, using both gray-scale and HS images. However, using only the gray-scale or only the HS image are specifically claimed embodiments. Also, comparable variations are in the scope and construction of claims. For example, gray-scale images may produce by different weightings of the RGB planes. Also gray-scale images may be generated from other color spaces, such as HSV, CYMK, and CIE, such as used in MPEG4 encoding. Similarly, single valued pixel images that ignore or minimize value are viewed within the scope of HS images. HS images may be generated by methods other than a geometric mean, such as summing, and the like. Also, just the hue plane or just the saturation plane may be used; and these are still variations of the HS single valued pixel image in claims.

In step 54 we start to consider individual features for each potential match between the vending image and each product reference image associated with each candidate product in the candidate product ID list. For this, we run a plurality of feature detection/extraction algorithms. These are run on full color images. Using more than algorithm is novel aspect of embodiments. Such algorithms include SURF, BRIK, MSER, and SIFT. SIFT is a preferred algorithm and thus may be given more weight. Ideally we use rotationally invariant algorithms, or select parameters such that they are rotationally invariant. Packages in vending machines are often tipped left or right, and may also be loaded horizontally or vertically. Crumpled package edges may also appear in an image as an effective rotation of that part of the package. Also preferred are algorithms that are relatively insensitive to tilt, as most products in the image will not be aligned perfectly perpendicular to the axis of view from the camera to the product.

The output of each feature detection/extraction algorithm is a "list of features." That is, roughly, the algorithm finds "some part of the reference image in some part of the vending image." In most cases, an algorithm will also generate for each feature, a transformation and a confidence. The transformation describes generally how the feature is shifted in location and size from the reference image to the vending image (and may also include rotation), while the confidence indicates how good the feature match is, for that feature. Often the number of feature found is high—over 100. Note that the number of features found is also a function of specific parameters selected for the algorithm and aspects of the images themselves, such as resolution.

Feature detection and extraction algorithms, as used in step 54, are often highly compute intensive. Some different algorithms share similar or identical portions of processing; in particular, keypoint detection. Therefore, it may be advantageous in some embodiments, and is specifically claimed as one embodiment, that a plurality of different feature detection/extraction algorithm share processing that is in common, thus executing that shared processing only once, instead of multiple times. Such shared portions may include key area detection. Sometimes key areas are called "blobs." Some keypoint detection may be done as preprocessing, such as in steps 42 through 44.

Steps 54 through 72 are performed for the potential match between the vending image and each reference image associated with each candidate product in the candidate product ID list. These steps may be performed sequentially for each such candidate product, or they may be performed in parallel, or in any desired combination. For simplicity of explanation, we show sequential computation in the Figures. The loop for each candidate product in the candidate product ID list is shown as bubble D in FIGS. 5 and 7, 59 and 79 respectively.

The outputs of the algorithms in step 54 are collected together in a list, in step 55. Each feature in this list is recorded along with both its transformation and confidence. This list is called the "candidate feature list." This step may include a "matching algorithm" to select either keypoints of the same type, such as those generated by compatible feature detection/extraction algorithms, or may match based on other feature parameters. Generalized matching algorithms are well known in the art, such as regression analysis, multiple regression analysis, least squares fit, and many others. Use of matching algorithms in this step does not occur in all embodiments.

This list may be initially quite large—over 1000 features. Note that such a list is created for every pair of image comparisons. For example, if one vending image is compared to 300 reference images, then 300 such candidate feature lists will be created—for a single coil in a single vending machine. Therefore, it is important that embodiments cull this list—that is, make the list shorter, prior to further processing of the individual candidate features. Note that for single-valued-pixel images, the color vector may be computed for a single value, that is, a Gaussian plane is now a Gaussian line. This vector contains color information only if the image being processed contains color information.

Steps 56 through 66 cull or prune the candidate feature list. Such steps may be performed in various orders, not necessarily the particular exemplary order in the Figures, even though these culling steps are identified as, "first," "second," and so on, such naming is for convenience of discussion rather than a requirement of the invention.

In step 56 we cull the candidate feature list using transform type. For example, we may toss out features that are too far away from each other. For example, a feature near the center of the reference image may be mapped to a corner of the vending image. The type of distortions that happen placing a CPG in a vending machine cannot product this movement of package image features, and so features with transforms that move features too far may be culled. Similarly, image size adjustments have already been made, such as in step 41, or by cropping, or adjusting resolution, so that the scale of the reference image and the vending image are as close as possible. Thus, a transformation that requires a feature to be enlarged or reduced too much, such as by more than 3%, 5%, 10%, 15%, 20%, 30%, or 50% may be discarded. Similarly, features with a transformation for rotation, where that rotation is known to not be possible in the particular vending image, may be discarded. For example, a candy bar might be placed horizontally, or may be horizontal and upside down. Therefore, rotations in the range of 0° plus or minus 15° or 180° plus or minus 15° may be OK, but rotations outside of these two ranges may be used to cull the feature. Such permissible rotation ranges may depend on coil type, or on other image pre-processing, or on other information.

When we compare features we only compare features of the same type. For example, blobs to blobs, and corner features to corner features. Features from SURF should only be compared to other features from SURF, or to features with similar attributes; that is, of the same feature type.

In step 57 the culled candidate list is sorted by both confidence and transformation type. Weighting factors may be used. Selection of weights and thresholds for sorting may be determined by testing, selecting parameters that produce the best end result of the invention. Such weights may depend on other information, such as generated by image preprocessing, or knowledge about a particular the particular slot associated with the vending image. For example, hard products such as cans, bottles and boxes should have little distortion, compared with soft products such as socks or a bag of pretzels.

Figure 6:
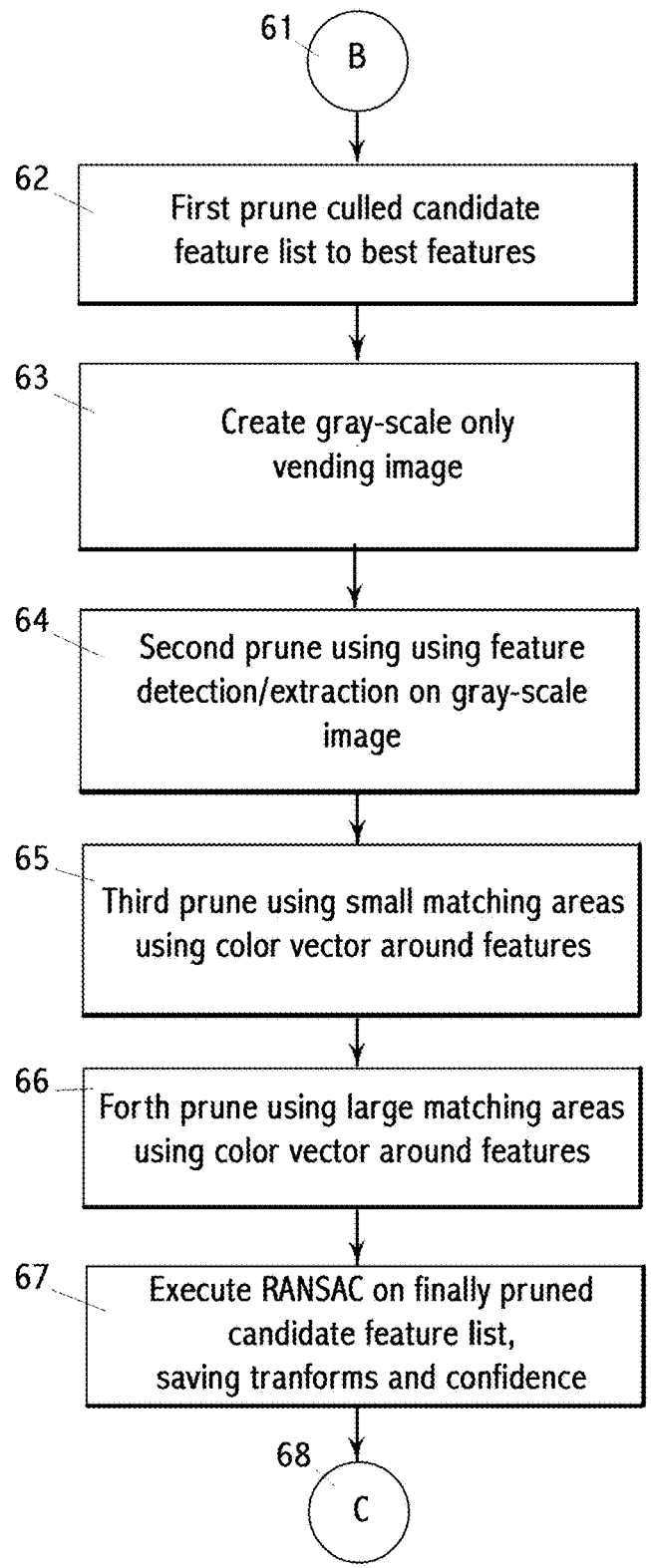
FIG. 6 shows a continuation of FIG. 5.

This exemplary embodiment steps continue via bubble, "B," 58, in FIG. 6.

In FIG. 6, step 61, bubble, "B" is a continuation from FIG. 5.

In step 62, we continue pruning the culled, and now sorted feature candidate list by selecting only the best features on the list. We may limit the list size to a size in the range of 50 to 1000 features, or in the range of 100 to 200 features.

In step 63 we create a gray-scale version of the vending image. Note that we have either already created a gray-scale image from the color reference image in step 43, or we do that now. It is worth noting that the steps relating to aggregate color vectors did not typically look at value of pixels (light v. dark) using the HS plane only of the HSV color space. But now we focus on the pixel values by using gray-scale only image comparisons. In step 63 we may also create an HS image, as described elsewhere herein.

In step 64 we again run feature detection/extraction algorithms, but this time on the gray-scale images. Although desirable to use a plurality of algorithms, some embodiments might use a single algorithm, such as SIFT. The algorithm considers only those features in the culled candidate feature list from step 62. Features that do not meet a gray-scale confidence threshold are discarded from the list.

In step 65 we further prune the candidate feature list. We refer to this step as "small matching areas." Each feature in the candidate feature list has a "reference feature" and a "target feature." The reference feature is in a specific area in the reference image. The target feature is in a specific area in the vending image that, ideally, contains the reference feature. Features size and shape varies; there is mapping vector that points from the location of the reference feature to the location of the target feature. The "small area" is an area of pixels around the target feature; that is, roughly speaking around the end of the mapping vector. This small area of pixels, such as a five by five pixel area is compared to the corresponding small area of pixels around the start of the mapping vector. The comparison itself may use any of several comparison algorithms known in the art, such as two-dimensional correlation. Another comparison is to use a new "small area color vector." This small area color vector is computed just as for the aggregate color vectors, only now only the pixels in the small area are included in the summing. For example, if the small area is five by five pixels, there are only 25 vectors to sum, for both the reference feature and the target feature. The comparison is then the Euclidean distance of the two vectors. There is a threshold in this step. If the comparison does not meet or exceed a threshold for quality then the feature is pruned from the candidate feature list. Quality, here, refers to the similarity of the target feature to the reference feature. The small area may be three by three, five by five, seven by seven, or ten by ten pixels. The size of the area does not need to be square or rectangular. The size of the small area may vary depending on the transformation or confidence.

Generally speaking, we may think of step 64 as considering "feature shape" such an edge or gradient of brightness; while step 65 considers color. Extending this concept, we see that many steps of embodiments alternate between consideration of pixel value only with consideration of color. For example, steps using data from HS plane, color vectors for early elimination of reference images, color vectors in small area and large area matching, and use R, G, B color planes all consider color. Use of gray-scale images, such as are used in the major step 54, consider brightness (values). Key novelties and non-obviousness over prior art of embodiments includes these unique combinations of alternating use of feature shape and use of color in image processing steps for culling, pruning, matching and selecting.

An optional comparison in one embodiment is to use the "small area" comparisons for each of R, G, and B representation of the small area separately. The small areas should correlate within a threshold for all three colors, (or at least two out of three) otherwise that feature match is dropped. When considering only one color at a time, such as green, the pixel values are scalars, which can considerably speed up feature comparison execution time. We refer generally to this technique as "color pruning." Color spaces other than RGB may be used.

The way that the red, green, and blue images are used, in one embodiment, is after culling, at the end of pruning. We already have a candidate feature list, where each feature comprises a source point in the reference image and a target point in variations of the vending image. These features also comprise a diameter or "radius" of interest. When considering the red, green and blue planes, we use the feature list, as pruned at that step in the method. We look for similarity between the reference image and the vending image, in those colors. If we have a real match, it should match for all those colors, reasonable closely. The area we look at is typically larger than the diameter of the feature. Again, if it is a real match, a larger area should match, too. The diameter we look at may be a fixed size, or preferably it is a variable size responsive to the radius in the feature. Various well-known algorithms are used for this area comparison, such as vector distance, correlators, and the like. From these three comparison (red, green, and blue) we then have three scalar values. These values should be a likelihood, or a confidence, scalar. Traditionally, this likelihood varies from zero to one. We can use the same feature comparison (also called feature matching) algorithms as used elsewhere in the method. Note that again, we can only compare features of the same type. Based on these values, we prune the feature list some more. This "RGB" step is optional. It is in some embodiments and not others. Also, if the feature list is already small, such as under 50 or under 20 features, we may not want to or need to prune it any more. A range of feature count for such a threshold may be in the range of 10 to 500, 15 to 250, 20 to 150, 25 to 150, or 30 to 75. Different algorithms may be used to determine prune or not, based on the three RGB comparison values. If two of the three don't match well, we certainly want to prune the feature. If all three match well, we certainly want to keep the feature. We might also sum, multiply, or take the geometric mean of the three values, to help in the prune or don't prune decision.

Yet another embodiment is to create an image that uses a single scalar per pixel, only that pixel value is the geometric mean of the pixel's hue and saturation. We refer to the values in this image as H*S. Pruning with this image format we refer generally to "H*S pruning," although HS pruning may be considered to be part of color pruning.

In step 66 we further prune the candidate feature list. We refer to this step as "large matching areas." This step is similar to step 65 except we use a larger area around the ends of the feature-mapping vector. For example, we may use 10×10, 15×15, 20×20 or 25×25 pixels. Or, a size responsive to the radius of the feature being compared. One advantage of steps 65 and 66 is that the computation is generally linear in time with the number of pixels considered. Thus, the computation time for a five by five small area is only one sixteenth as much time as for a 20×20 area. Eliminating features in step 65 is therefore much faster than eliminating features in step 66. The smaller the candidate feature can be made from step 65 the less time is required to compute in step 66. In some embodiments there is also a third or additional area computations, each considering consecutively larger pixel areas. Note that, like the aggregate color vectors, ideally we use color plane of Gaussians. Of course, these "color vectors" don't really include color information. The "Gaussian plane" is now a "Gaussian line," since the images being compared are single valued pixel images. However, a cruder method of computing color vectors may be used to reduce computation time. We may be able to re-use the color vectors computed for each pixel in step 64; now using the ends of the feature-mapping vector and the area size to select which vectors to sum.

Similarly to the option above for small area matching, large area matching may also consider R, G, and B data only, that is color pruning; discarding a candidate feature unless all three comparisons are above a threshold of quality. Similar to the option above for small area matching, large area matching may also use H*S images for H*S pruning.

After step 66 we now have a "pruned candidate feature list." This pruned list may have from five to 50 features in it. Note that we have such a candidate feature list for every image (product) in the candidate product ID list for the vendor image.

For convenience, we use both terms: "culling" from "pruning." Nominally, culling may include modifying the confidence of a feature in the candidate feature list, either up or down, as well as dropping the feature from the list. Pruning, nominally includes only dropping features, or not, from the list. However, such naming is really for convenience of discussion. The two names, culling and pruning, should be construed widely in embodiments, both names construed as performing any combination of altering confidence or dropping.

In step 67 we run RANSAC on our finally pruned candidate feature list. RANSAC is an iterative algorithm whose purpose is to first remove outliers from a relationship, then identify the specific relationship. Some embodiments use alternative algorithms to remove outliers and find a relationship, including clustering algorithms. RANSAC generates both transforms and confidence; these are saved. Our RANSAC or equivalent algorithm should ideally be both rotation invariant and also "affine" so that package tilt does not matter. The transform does matter, as feature scaling must be within a known range, based on the package size difference between the product in the reference image and the product in the vending image. Also, the location mapping must be consistent for all valid feature matches. Packages may be rotated, tilted or slightly crumpled, but they may not be grossly distorted. Outlier removal by RANSAC or equivalent may use these just-specified requirements to eliminate a large number of potential features prior to identifying an overall transform and confidence. See FIG. 9, 93-94 for the number of features (yellow lines) "before" RANSAC and 95-96 for the number of features "after" RANSAC. The number of yellow lines in FIG. 9, 93-94 may also be prior to pruning of the candidate feature list. Removing outliers is optional, although preferred. Outliers may be removed inherently by an algorithm, such as RANSAC, or may be removed explicitly in another step, which is claimed as an embodiment, by considering, for example, either its location, transform, or confidence, with respect to the output of the step 67.

Embodiments are also claimed where step 67 is run iteratively. That is, outliers may be removed, and then culling/pruning steps, in various combinations may be re-run using and then step 67 repeated. That is, once RANSAC or another algorithm has identified a candidate transformation, feature identification, extraction, and culling/pruning steps may be performed responsive to that transformation.

Note that RANSAC, or another algorithm for this step, is run using transformations, not curve fitting to a straight line, as is an option for RANSAC and as is sometimes shown in information about RANSAC. Such use of a transformation based relationship/outlier algorithm is a key limitation in some embodiments.

Figure 7:
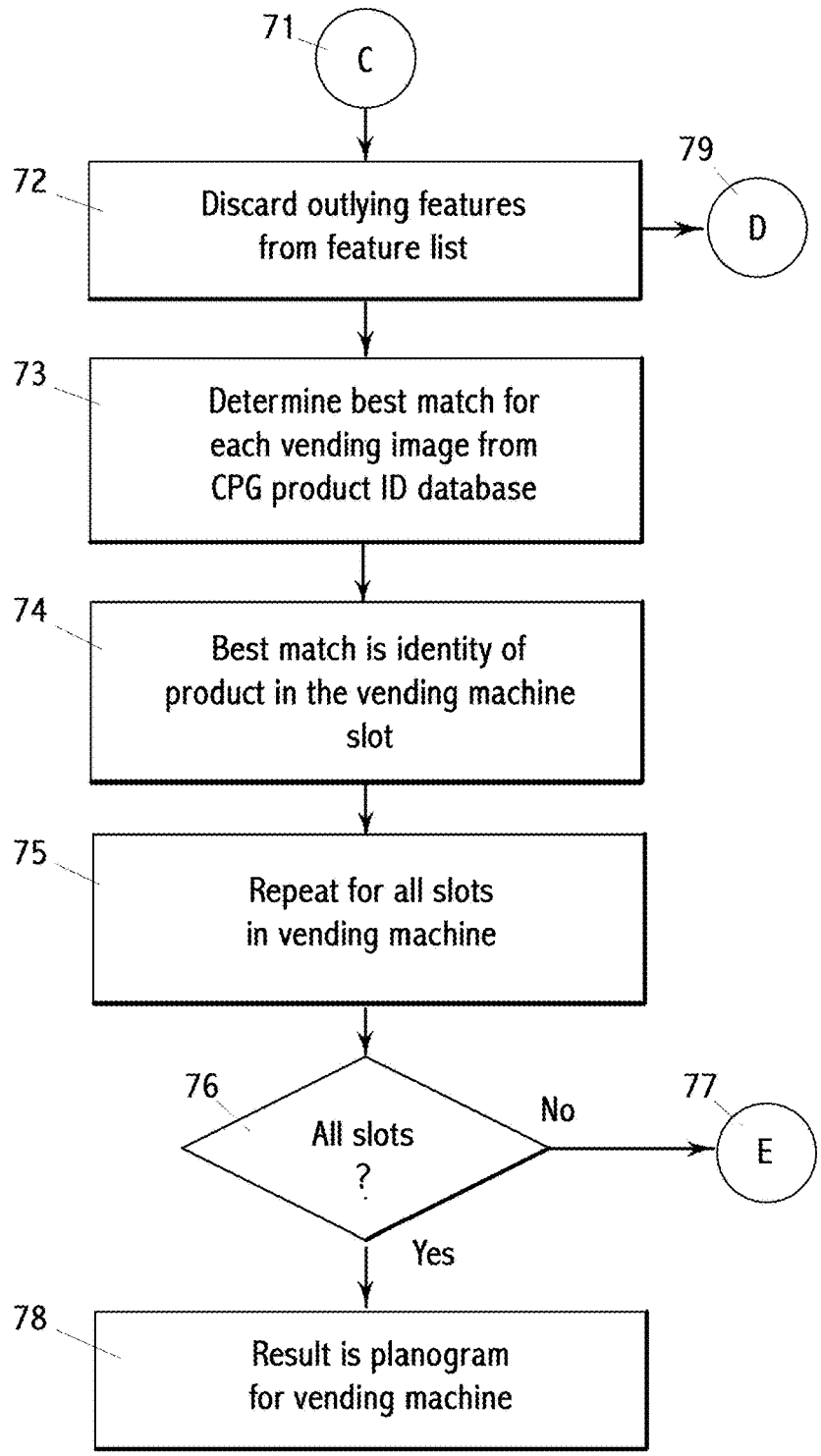
FIG. 7 shows a continuation of FIG. 6.

This exemplary embodiment steps continue via bubble, "C," 68, in FIG. 7.

In FIG. 7, step 71, bubble, "C" is a continuation from FIG. 6.

In step 72 we discard the outliers as identified in step 67.

Steps 54 through 72 are performed for the potential match between the vending image and each reference image associated with each candidate product in the candidate product ID list. These steps may be performed sequentially for each such candidate product, or they may be performed in parallel, or in any desired combination. For simplicity of explanation, we show sequential computation in the Figures.

The loop for each candidate product in the candidate product ID list is shown as bubble D in FIGS. 5 and 7, 59 and 79 respectively. Step 72 continues to loop via bubble D, 79 to bubble D, 59 in FIG. 5 until all candidate product ID reference images have been processed. Once they have all been processed, the embodiment proceeds with stop 73. One example of feature matches that may be discarded due to transforms is when the target location is outside of the actual package in a vending image. Another example of feature matches that may be discarded due to transform, after step 67 (RANSAC or another outlier/relationship algorithm) are matches that have an unacceptable scale, such as being five times larger in the target image. The concept of "outliers," in general, from step 67 is they do not match the primary transformation found by the algorithm in this step.

In step 73 we use the transforms and confidence from step 67, as reduced by step 72, for all of the candidate products in the candidate product ID list, to determine the best match for the vending image from the candidate product ID list. Best match might be determined by the total number of remaining features, or may be determined by the total confidence summed for all remaining features, or some other weighting of threshold determination responsive to the outputs of steps 72.

In step 74 the best match from step 73 is saved. Additional processing may occur in this step, such as showing the best match, and possibly runner-up matches to a person, or storing or transmitting the best-matched product to a database or another computer. Matching algorithms are discussed in more detail elsewhere herein.

Method steps 45 through 74 identify a best match product ID for a single slot in a single vending machine. These steps are repeated for each slot in the vending machine to produce a planogram for that vending machine.

In step 76 we determine if we have processed all slots in one vending machine. If not, we loop via bubble E, 77 to bubble E, 49 in FIG. 4. If we have processed all coils, then we continue to step 78, where we now use all of the best matches from steps 74 to complete the planogram for one vending machine, the purpose of this embodiment of this invention.

The best matches may or may not be shown to a human for confirmation. Such confirmation may be done away from the vending machine, for example by looking at the vending image and the reference image side by side. Such confirmation may be done in the field by a driver or other person. Confirmation may also use other information, such as prior planograms, or planograms from similar vending machines, or sales history.

To be useful and valuable, automatic planogram detection does not have to be perfect.

A device of an embodiment of this invention may comprise one or more computers, servers, cameras, hand-held electronic devices, non-transitory memory, and communication elements as needed, in any combination, to implement methods of embodiments.

FIG. 4 describes various preprocessing steps, such as 41-44. Preprocessing steps are also described in claim steps (a) through (d), (t), (u) and (z). Embodiments are specifically claimed where the results of these steps may be acquired, such as from a third party, rather than computed. Embodiments are specifically claimed where these steps may be performed in any order, including inside iterative loops, or, in particular, in parallel with other steps, or inherently as part of other steps.

FIGS. 4 through 7, and claim steps (k) through (p), (y), (cc), and other claim steps and other claims limitations, describe steps or methods to reduce the size of either a candidate product ID list or a feature list. Embodiments explicitly described, such as in claims or drawings, are preferred embodiments. However, embodiments are claimed where such reducing, culling or pruning of such lists are done in other orders. While such other orders may be less efficient, potentially much less efficient, they are nonetheless embodiments. Indeed, the preferred embodiments described are novel and non-obvious because, in part, they dramatically improve efficiency, cost and reliability of applications of embodiments of this invention.

Figure 8:
FIG. 8 shows color intermediate images used in one embodiment of this invention.

Turning now to FIG. 8 we some exemplary images to assist in understanding method steps. These images are provided for clarity of explanation and are not themselves part of an embodiment or method step. All of the six images, 21 through 26 are for one CPG, here a Starburst® candy bar. The larger images 24, 25 and 26 are exemplary reference images from a reference image database. The smaller images 21, 22, and 23 are exemplary vending images of one coil of one vending machine. Note first that in terms of image "size," that is pixels, or resolution, the reference images are typically larger than the vending images. Typically, images are either scales, decimated, or otherwise made to be the same size for various method steps, or the method steps themselves accommodate the size difference. For example, consider comparing feature from the reference image 24 into the vending image 21. A feature detection/extraction may correctly identify a corresponding feature in image 24 in image 21, with a transform that reduces the size to 35% and rotates by −95°. As long as all correct features are mapped to a similar size ratio and similar rotational angle, it may not be necessary to first align the vending images by size and rotation.

Images 24 and 21 are full color images. Such images are used to create color vectors. Images 25 and 22 have been processed to identify a particular color, here, yellow, which appears light, while other colors appear black. For example, 25 and 22 may show a single Gaussian, near saturated yellow. Images 26 and 23 are gray-scale. Gray-scale images are used in some method steps.

Figure 9:
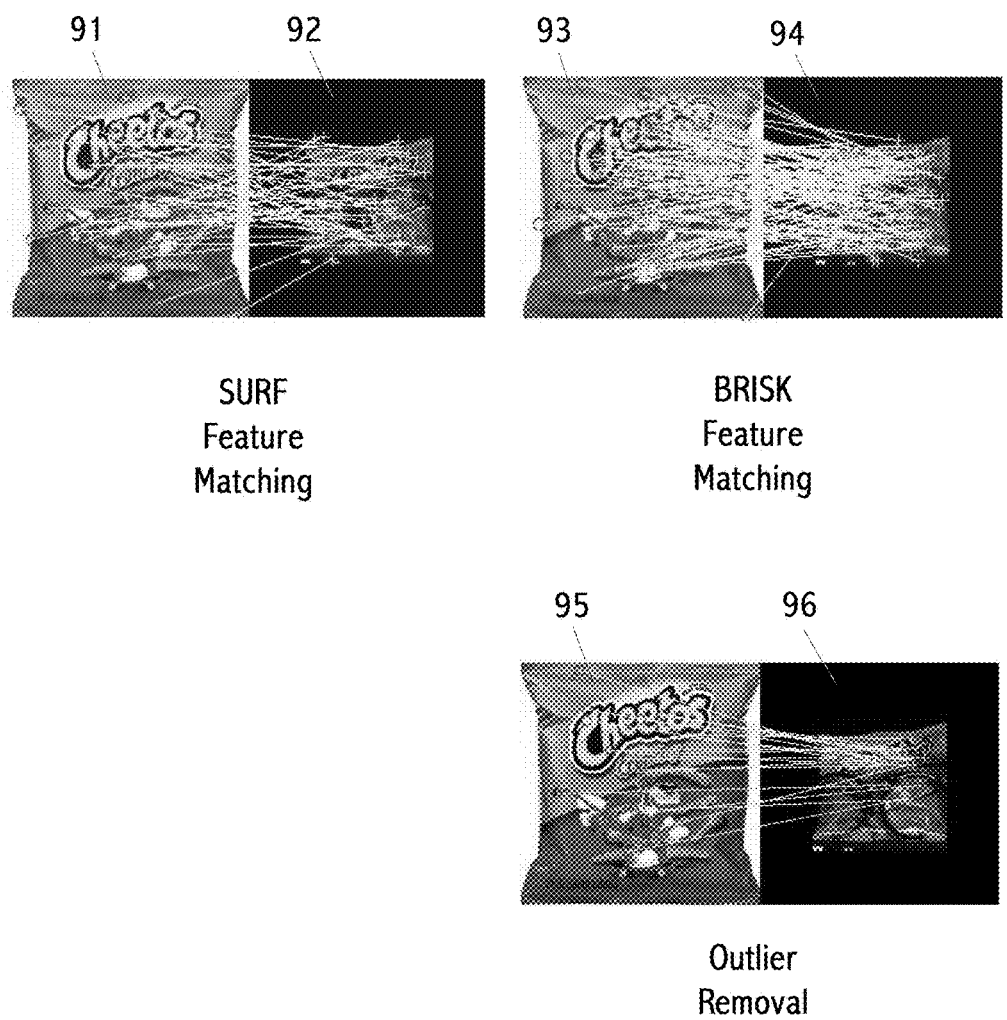
FIG. 9 shows in color the results of different feature mapping steps.

Looking now at FIG. 9 we see visually the results of some feature detection/extractions algorithms. Here, images 91, 93 and 95 are one reference image, while 92, 94 and 96 are one vending image. Image pair 91 and 92 shows an exemplary result of a SURF feature-matching step. Each yellow line between 91 and 92 represents one feature mapped. The green crosses in 92 two show the "target" location of each feature-mapping vector. Note that many of the yellow lines are crossed because many of the feature matches are "wrong," meaning that they are not really corresponding parts of the underlying Cheetos® package image. These are called false feature matches. Image pair 93 and 94 shows exemplary results of a BRISK feature-matching algorithm on the same pair of images. Comparing the yellow feature mapping vectors in 91-92 with 93-94 one observes very different mappings. The yellow lines in 91-92 and 93-94 may be viewed as a graphical representation of un-pruned candidate feature lists. Note that actual feature transforms and confidence are not shown in these exemplary illustrations. Image pair 95 and 96 show the result after pruning the candidate feature list and after the RANSAC step has removed outlier feature matches. Note there are far fewer features (yellow lines) and they now appear to reasonably map the visual elements of the reference Cheetos bag in 95 to the vending image of a Cheetos bag in 96.

Figure 10A:
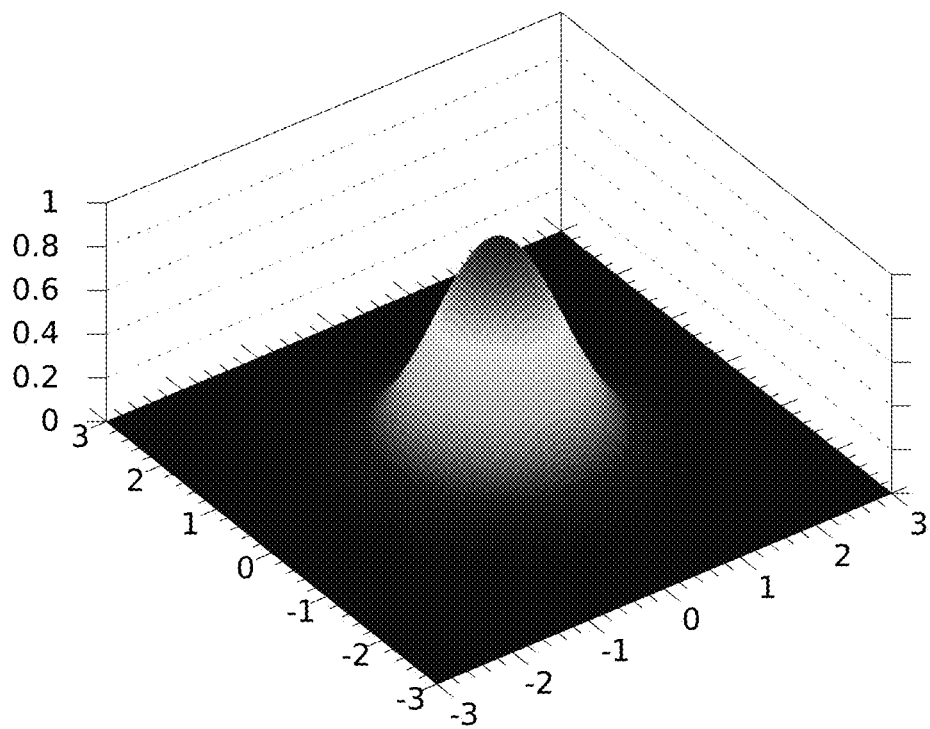
FIGS. 10A and 10B show exemplary Gaussians in a color space plane.
Figure 10B:
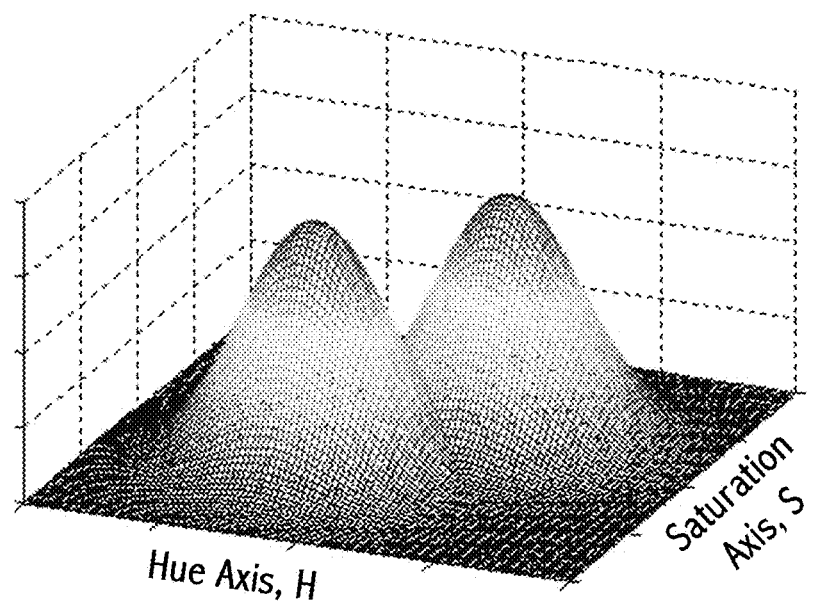

Turning now to FIGS. 10A and 10B we see some Gaussians. FIG. 10A shows a generic two-dimensional single Gaussian. This Gaussian has normalized amplitude of one and is located at a normalized location on two axes of 0,0 with a normalized sigma of one. The colors in this Figure show only amplitude on the Gaussian; they are unrelated to any color information in an image.

FIG. 10B shows an exemplary map of two, two-dimensional Gaussians in an HS color image plane. Note in particular that they overlap. This means that a single pixel has a non-zero value in both Gaussians. The value for that pixel for a given Gaussian, that is, that element location in the color vector, is the amplitude of the Gaussian at the HS value of the pixel. Note that as for FIG. 10A, the color in this Figure is only to show Gaussian height and is unrelated to the color information in the HS plane. In practice, an actual HS plane in an embodiment may have from six to 500 Gaussians. Pruning using such "HS filtering" may be done at any time during culling/pruning. However the order as shown is a preferred embodiment.

Figure 11:
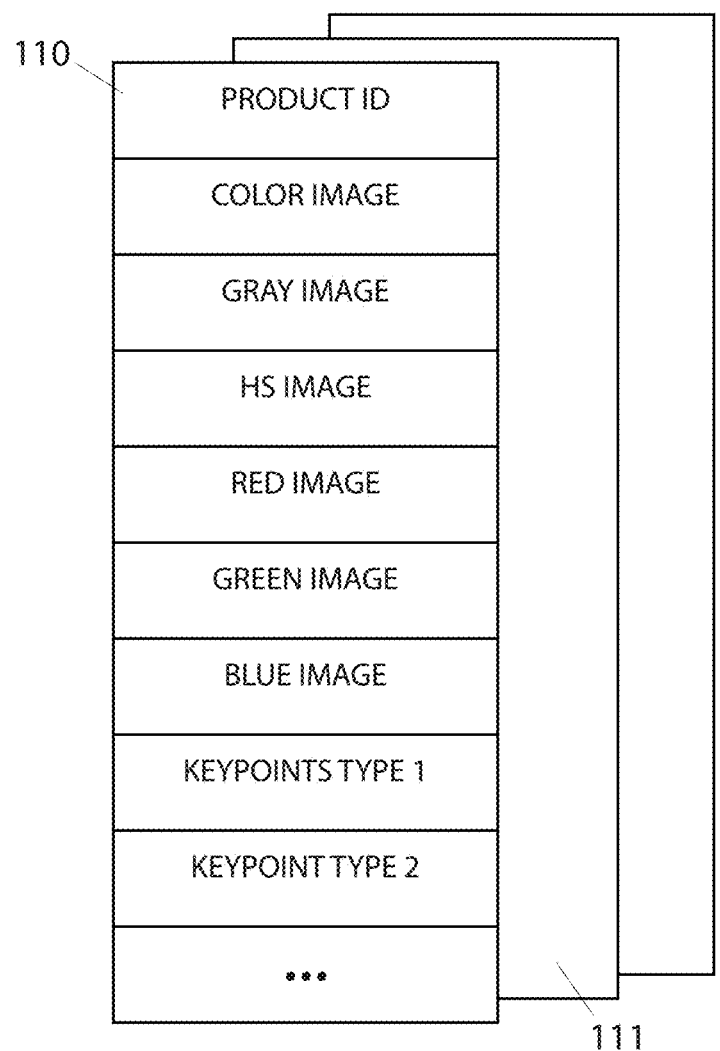
FIG. 11 shows exemplary elements in a reference image database

Embodiments include the use of Gaussian maps in dimensions higher than two, such as a three-dimensional Gaussian map. Such a map may use Gaussian curves distributed in a 3D color space, such as RGB, CMYK, HSV, or CIE Turning now to FIG. 11 we see one exemplary entry in the CPG reference image database, also called the "product ID database." A list of elements is shown for one entry, 110. The product ID is an index into this database. The color image is typically provided by the CPG product manufacturer, but may come from an industry source or other source, The gray image is generated from the color image, as a step in embodiments, as described above. Similarly, the HS image, and the red, green and blue images are generated as described above. The keypoints are created by image detection/extraction algorithms, as described above. It is useful to keep keypoints organized by different types, as shown. The two elements for Type 1 and Type 2 keypoints are indicative that multiple detection/extraction algorithms are used in embodiments. The three dots at the bottom of entry 110 show that there are typically more than two types of keypoints and that the entry 110 will often contains other information. Note that the CPG database shown in this Figure and described herein is schematic, and may be implemented in many different forms, include structures or objects, or distributed information. 111 shows that there are multiple entries in the CPG reference image database, typically thousands or tens of thousands. This Figure is non-limiting and shows some optional elements.

Figure 12:
FIG. 12 shows is a color view of an exemplary vending machine with CPG images in cells, overlaid with the results of an embodiment that has identified products in coils.

Turning now to FIG. 12, we see a color image of a vending machine with its coils filled with different CPG products. A key aspect of this Figure is that it shows the results of embodiments. In particular, colored shapes over images in coils show the result of RANSAC identification of transformations from a reference image to the vending image. Another aspect is that most of the coils have been correctly identified as to the actual product in the coil, as shown by the white numbers overlaid on the product in the coil. 122 shows a violet outline around potato chips in coil 2. This outline shows the transformation from RANSAC that correctly identified the product. Note that the transformation is both rotated and tilted. The references images in the database are numbered. Here, there numbers happen to match the actual coil number, an arrangement of the reference database numbering that happens to make it clear from this image, and similar images used in the creation of this invention, if the identification of an embodiments is correct. Here, reference image 02 is indeed matched with coil 2, so we know the identification was correct. 123 shows a blue Doritos® bag correctly identified as reference image 03. Note that the blue outline is tilted slightly and slightly trapezoidal. 124 shows a different Doritos® bag properly identified as reference product 05. Note that the bag in coil 03 is similar in pixel values to the bag in coil 05, however, the colors are significantly different. This is an example of why color processing is both important for the application of embodiments and also why the early processing using color vectors is an effective way to reduce the number of comparison to different reference products for each vending image.

Continuing with FIG. 12, we see in 125, coil 07 Kettle Cooked® chips also correctly identified. Note the highly non-rectangular shape of the purple transformation matrix from RANSAC. This 125 is an example of why it is important that RANSAC be run in a mode to generate transformations that are affine and rotation independent. A similar non-rectangular transformation for coil positions 6, 16, 23, 24, 26, and others. Note that in coil locations 26, 28 and 30 the transformation shown is considerably smaller than the entire CPG image. This may be due to either scaling or removal of features from a feature list that mapped outside of the shown transformation results. Such features may have been culled, pruned, or classified as outliers by RANSAC. 121 shows a coil that was not identified. It has not colored box and no white identifier number. For this coil, feature matching failed to pass a threshold of quantity of features or of confidence of matches.

FIGS. 8, 9 and 12 show actual intermediate and final results of running working embodiments of this invention.

We have not yet discussed "coil detection" in embodiments. However, there are several places where coil detection may be advantageous. First, well-known algorithms such as the Hough algorithm are very good at detecting coils, as partial circles, in an image. This may be used in a vending image that includes more than one cell, including the entire vending machine, to locate cells accurately in order to isolate them as vending images for the primary embodiments. The Hough algorithm may also be used to identify a coil in a vending image of a single vending cell. Once identified, it should have the minimum impact on comparisons, as it is in the vending image but not the reference image. One way to minimize the impact is to add a coil into the reference image and reprocess the reference image as now altered. Another way to minimize the impact is to set the pixels where the coil is to a value that minimized the effect for any method step. We can't normally "discard pixels" in image comparison algorithms that are in the interior of an image, although it would be handy to have image comparison algorithms that worked with such images that have such a "z-plane," such as png image formats. One way to minimize the effect of the coil is to discard features in the candidate feature list that map to locations in or near the coil or the coil shadow. Algorithms other than Hough may be used to locate coils, including correlation algorithms and traditional feature detection, extraction, and matching algorithms, where now an image of a coil is used with the vending image instead of the reference image in the CPG reference image database.

Those trained in the art are familiar of know of many image processing algorithms, including both those discussed herein and ones not discussed herein. Matlab® from Mathworks has a large library of image processing capabilities and algorithms and should certainly be looked as a source for describing or implementing method steps and algorithms.

Video is advantageous for showing product and planogram details, as the video may move from one close-up to another, capturing all products in all coils, with sufficient resolution to read expiration dates printed on packages, for example. Video is advantageous for other state information such as cleanliness and damage, permitting multiple views of the inside and outside of the machine in a single video clip. Video is advantageous for showing the machine location, as location contextual information, such as hallway numbers or floor numbers, may be captured, showing the machine's relative location to such facility location identification.

A photograph or image comprises either a still photograph or a video photograph. A photograph or image may be 3D, may comprise infrared information, and may comprise audio information, and may comprise meta data, such as geographical coordinates, date, time and the like. A photograph or image may comprise virtual reality information.

Embodiments are claimed using any combination of dependent claims and limitations of dependent claims, applied to any independent claim. Claims as originally filed are hereby incorporated by reference into this specification. Language and terminology in claims and Figures may differ from relevant discussion and support in this specification. However, as one trained in the art knows, such variations in terminology are understood and does not diminish support in the specification for claimed features, limitations or embodiments.

Definitions

Coils, cells, or slots—A location in a vending machine that holds one type of product. See also Facings.

Computer—An electronic device capable of executing the algorithms described, comprising a processor, non-transitory memory, and communication ports. Also called a server. A computer may be handheld by a driver at a vending machine, at a fixed location, or in the internet "cloud." A computer may be distributed or virtual.

CPG—Consumer Packaged Goods. These are typically the type of product stocked in vending machines. Other products or services may be offered and sold in vending machines.

Driver—A person who services vending machines. A driver may taken an image of a vending machine or slot, may initiate any portion of method steps, and may use any results of the method steps.

End customer—The person who selects a product from a vending machine. Typically, this is the same person who pays for and consumes the selected product, but neither payment nor consumption is strictly required.

Facings—Products visible to an end customer in a vending machine, or the location in a vending machine, visible to an end customer, that holds a specific product. Although traditionally each facing is a mechanical compartment or mechanism, in an electronic machine facings may be represented to an end customer as icons. Facings are typically in identified in a row and column format, such as "D2," or simply numbered sequentially. Facings are closely related to slots; however, the term facing is used primarily in the context of what an end customer sees or selects while slot or coil is used primarily in the context of a planogram or physical loading or loaded products in a vending machine.

Image—A digital image that may be a still image, a video image, a virtual reality image, or any combination.

Manufacturers—The companies that manufacture or distribute products, such as Consumer Packaged Goods.

Merchandising—The placement of products in a vending machine. Merchandising includes the selection of the product mix, placement location of products in the machine, stocking levels, pricing, and promotions. Merchandising may include one or more planograms, in particular, a picture showing preferred locations within a vending machine for products.

Planogram—The arrangement of specific products in specific slots in a vending machine.

Product—A specific product that is or could be placed in a vending machine for sale. Most products are unique, however, a product might include a mix of other products. For example, one "product" might be a mix of different flavors of Clif Bars™, a packaged single-serving snack food. Examples of common products include single-serving, packaged snack foods, energy bars, candy, cookies, nuts, soft drinks, and drinking water. Some products sold from vending machines include hardware and electronics such as memory cards, cables, batteries, and personal electronics. Some products sold from vending machines include personal care products. Some products sole from vending machines include prepared meals or consumables. Services such as phone cards, gift cards, or insurance may be products sold in a vending machine.

Product mix—includes (a) the specific products in a vending machine, and (b) the placement location of those products in the vending machine, and (c) the stocking level of those products in the vending machine.

Product name—identification of a unique product or range of similar products for use in a vending machine. Such a product name might include a range or set of unique products such a multiple flavors of product, or different mixes of nuts, as a few examples.

Server—One or more computers providing computation, storage, and at least one specific service. A server may have distributed components. A server may be a virtual server, running in a defined computational space on another processor.

Service of a machine, or machine service—Restocking a machine with products, including adjusting the product mix or stocking levels, if necessary. Other service actions may include: cash collection, hardware service, cleaning, reprogramming, testing, configuration, moving the machine, refunds, communicating with end users, communicating with the facility manager, and other services.

Vending machine company—A company that generally owns and services vending machines. They may not own all of the serviced machines; and they may not service all of the owned machines.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

All numerical ranges in the specification are non-limiting examples only.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims.

We claim:

1. A method of automatically determining a planogram in a vending machine comprising the steps of:
   (a) acquiring a Consumer Packaged Good (CPG) reference image database comprising an each color reference image for an each product ID;
   (b) creating a each reference image color vector for the each color reference image, first discarding outlier pixels responsive to a pixel value; wherein each reference image color vector is responsive to a two-dimensional Gaussian map in a two-dimensional color space plane; adding the each reference image color vector into the reference image database associated with the corresponding each product ID;
   (c) creating an each gray-scale reference image from the each color reference image and adding the each gray-scale reference image into the reference image database associated with the corresponding each product ID;
   (d) running a plurality of feature detection/extraction algorithms on the each gray-scale reference image, saving a set of reference keypoints detected by each of the plurality of algorithms in the reference image database, associated with the corresponding each product ID;
   (e) acquiring a color vending image of a slot in a vending machine;
   (f) creating a vending image color vector for the color vending image, first discarding outlier pixels responsive to pixel value; wherein the vending image color vector is responsive to the two-dimensional Gaussian map in the two-dimensional color space plane;
   (g) creating a gray-scale vending image from the color vending image;
   (h) comparing the vending image color vector to a subset of the each reference image color vectors in the reference image database; creating a sorted comparison list responsive to the comparing;
   (i) selecting a subset of the sorted comparison list responsive to the best comparison values—the "candidate product ID list;"
   (j) running the plurality of feature detection/extraction algorithms on the gray-scale vending image, saving a resulting set of gray vending keypoints detected by each of the plurality of algorithms;
   wherein method steps (k) through (q) below are performed for each candidate product in the candidate product ID list;
   (k) running one or more matching algorithms between the set of gray vending keypoints and the set of reference keypoints for the each candidate product; wherein matching is restricted to keypoints of a same keypoint type; the result being, for each candidate product, a candidate feature list;
   (l) culling the candidate feature list responsive to a confidence of each match in the candidate feature list; wherein culling comprises reducing the number of entries or altering the confidence of one or more entries, or both; thus revising the candidate feature list;
   (m) pruning the candidate feature list from the prior step responsive to a distance between a vending image small area color vector and a reference image small area color vector; wherein the small area color vectors are computed, for a subset of entries in the candidate feature list, for a small reference image area around the reference keypoints and a small vending image area around a corresponding vending image keypoint; thus revising the candidate feature list;
   (n) pruning the candidate feature list from the prior step responsive to a distance between a vending image large area color vector and a reference image large area color vector; wherein the large area color vectors are computed, for a subset of entries in the candidate feature list, for a large reference image area around the reference keypoints and a large vending image area around a corresponding vending image keypoint; wherein the large image areas are larger than the small image areas; thus revising the candidate feature list;
   (o) executing an outlier/relationship algorithm on the candidate feature list, saving a resulting feature confidence for each feature in the candidate feature list;
   (p) discarding outlying features from the candidate feature list, responsive to the previous step;
   (q) iterate steps (k) through (p) for all candidates in the candidate product ID list until all candidates in the list are so processed;
   (r) selecting the best match, for each candidate in the candidate product ID list, from each prior iteration of steps (k) through (p), for the slot in the vending machine, responsive to the number of non-discarded feature matches or highest total confidence values, or both, from steps (o) and (p);
   wherein the best match is the identity of a product in the slot in the vending machine;
   (s) iterating above steps (e) through (r) for all slots in the vending machine; wherein the color vending image and the slot update for each iteration;
   wherein the planogram of the vending machine comprises the results of the steps (r) and (s).

2. The method of claim 1 further comprising six steps:
   (t) creating an each HS reference image from the each color reference image and adding the each HS reference image into the reference image database associated with the corresponding each product ID; wherein the HS reference image is computed, for each pixel, as a scalar that is the geometric mean of the hue and saturation value of that pixel;
   (u) running a plurality of feature detection/extraction algorithms on the each HS reference image, saving a set of HS reference keypoints detected by each of the plurality of algorithms in the reference image database, associated with the corresponding each product ID;
   wherein steps (t) and (u) are performed between steps (a) and (e);
   (v) creating an each HS vending image from the color vending image; wherein the HS vending image is computed, for each pixel, as the scalar that is the geometric mean of the hue and saturation value of that pixel;
   (w) running the plurality of feature detection/extraction algorithms on the HS vending image, saving a resulting set of HS vending keypoints detected by each of the plurality of algorithms;
   wherein steps (v) and (w) are performed between steps (e) and (k);

(x) running one or more matching algorithms between the set of HS vending keypoints and the set of HS reference keypoints for the each candidate product; wherein matching is restricted to keypoints of a same keypoint type; the result being, for each candidate product, a HS match list;

(y) culling the candidate feature list responsive to a confidence of each match in the HS match list; wherein culling comprises reducing the number of entries or altering the confidence of one or more entries, or both; thus revising the candidate feature list;

wherein steps (x) and (y) are performed between steps (k) and (m).

3. The method of claim 1 further comprising four steps:

(z) creating three R, G, and B reference images from the each color reference image and adding the each R, G, and B reference images into the reference image database associated with the corresponding each product ID; wherein the three R, G, and B reference images are computed, for each pixel, as the red, green and blue scalar values, respectively, in the RGB color space, of that pixel;

wherein step (z) is performed between steps (a) and (e);

(aa) creating three R, G, and B vending images from the color vending image; wherein the three R, G, and B vending images are computed, for each pixel, as the red, green and blue scalar values, respectively, in the RGB color space, of that pixel;

wherein step (aa) is performed between steps (e) and (k);

(bb) matching features in the candidate feature list, using keypoints from the previous matching algorithms, comparing feature locations in the R, G, and B reference images to the respective R, G and B vending images, generating an RGB confidence for each feature;

(cc) pruning the candidate feature list responsive to the RGB confidence for each feature;

wherein steps (bb) and (cc) are performed between steps (n) and (o).

4. The method of claim 1 wherein:

the outlier/relationship algorithm in step (o) is Random Sample Consensus (RANSAC) algorithm.

5. The method of claim 1 wherein:

step (o) includes additionally saving a feature transform for each feature in the candidate feature list; and step (p) includes additionally discarding outlying features from the candidate features list responsive to the feature transform of that feature.

6. The method of claim 1 wherein:

step (r) includes selecting at least one additional match in addition to the best match, responsive to the number of non-discarded feature matches or highest total confidence values or both, from steps (o) and (p).

7. The method of claim 1 wherein:

the two-dimensional color space plane in step (b) is an HS plane constructed from a HSV color space by discarding a pixel value.

8. The method of claim 1 wherein:

the plurality of feature detection/extraction algorithms in step (b) comprise two or more of: SURF, BRIK, MSER, and SIFT.

9. The method of claim 1 wherein:

the outlier/relationship algorithm in step (o) is both rotationally independent and affine.

* * * * *